US012777293B2

(12) United States Patent
Pischel et al.

(10) Patent No.: US 12,777,293 B2
(45) Date of Patent: Oct. 27, 2026

(54) METHOD FOR OPERATING A HEARING AID, AND HEARING AID

(71) Applicant: Sivantos Pte. Ltd., Singapore (SG)

(72) Inventors: Claudia Pischel, Erlangen (DE); Maja Serman, Erlangen (DE); Ulrich Giese, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 235 days.

(21) Appl. No.: 18/654,274

(22) Filed: May 3, 2024

(65) Prior Publication Data

US 2024/0284125 A1 Aug. 22, 2024

Related U.S. Application Data

(63) Continuation of application No. PCT/EP2023/081579, filed on Nov. 13, 2023.

(30) Foreign Application Priority Data

Nov. 14, 2022 (DE) .................... 10 2022 212 035.3

(51) Int. Cl.
*H04R 25/00* (2006.01)

(52) U.S. Cl.
CPC .......... *H04R 25/50* (2013.01); *H04R 25/305* (2013.01); *H04R 25/70* (2013.01)

(58) Field of Classification Search
CPC ...... H04R 25/50; H04R 25/305; H04R 25/70; H04R 25/00; H04R 25/30; H04R 25/505;
(Continued)

(56) References Cited

U.S. PATENT DOCUMENTS 10,462,584 B2 10/2019 Auberville et al.
11,889,268 B2 1/2024 Kamkar-Parsi et al.
(Continued)

FOREIGN PATENT DOCUMENTS

DE 102017205652 B3 6/2018
DE 102018216667 B3 1/2020
(Continued)

OTHER PUBLICATIONS

Anonymous: "Signia Assistant—FAQ", Apr. 1, 2020 (Apr. 1, 2020), pp. 1-3, XP093121220, Found on the Internet: URL:cdn.signia-pro.com/-media/signia/global/files/app---telecare/signia-assistant_pro_faq_2020-04.pdf?rev =-1, [found on Jan. 18, 2024], the whole document.

*Primary Examiner* — Carolyn R Edwards
*Assistant Examiner* — Julie X Dang
(74) *Attorney, Agent, or Firm* — Laurence A. Greenberg; Werner H. Stemer; Ralph E. Locher

(57) ABSTRACT

A method is provided for operating a hearing aid of a user. The hearing aid has an input transducer, which produces an input signal, an analysis unit identifying a current scene from the input signal, and a signal processing unit having an OV processing unit. The signal processing unit is used to process the input signal into an output signal, and in this process, the OV processing unit processes the user's own voice in accordance with a number of OV parameters. The OV parameters are configured depending on the current scene, with the result that the processing of the own voice is scene-dependent. The hearing aid has an output transducer, which is used to output the output signal to the user. A corresponding hearing aid is also provided.

12 Claims, 2 Drawing Sheets

(58) Field of Classification Search
CPC ............ H04R 2225/00; H04R 2225/39; H04R 2225/41; H04R 2225/43
See application file for complete search history.

(56) References Cited

U.S. PATENT DOCUMENTS

| | | | | |
|---|---|---|---|---|
| 2006/0222194 | A1* | 10/2006 | Bramslow | H04R 25/70 381/314 |
| 2011/0125602 | A1 | 5/2011 | Kamada | |
| 2011/0150256 | A1 | 6/2011 | Baechler et al. | |
| 2019/0052977 | A1* | 2/2019 | Hannemann | A61B 5/291 |
| 2020/0107139 | A1 | 4/2020 | Lugger et al. | |
| 2021/0266682 | A1* | 8/2021 | Fischer | G06F 3/167 |
| 2022/0021993 | A1* | 1/2022 | Hildebrand | H04R 25/50 |
| 2022/0201407 | A1* | 6/2022 | Brielmann | H04R 25/554 |
| 2022/0272462 | A1* | 8/2022 | Pedersen | H04R 25/505 |

FOREIGN PATENT DOCUMENTS

| | | | |
|---|---|---|---|
| DE | 102020202483 | A1 | 8/2021 |
| DE | 102020216439 | A1 | 6/2022 |

* cited by examiner

METHOD FOR OPERATING A HEARING AID, AND HEARING AID

CROSS-REFERENCE TO RELATED APPLICATION

This application is a continuation, under 35 U.S.C. § 120, of copending International Patent Application PCT/EP2023/081579, filed Nov. 13, 2023, which designated the United States; this application also claims the priority, under 35 U.S.C. § 119, of German Patent Application DE 10 2022 212 035.3, filed Nov. 14, 2022; the prior applications are herewith incorporated by reference in their entirety.

FIELD AND BACKGROUND OF THE INVENTION

The invention relates to a method for operating a hearing aid, specifically a method for configuring an OV processing unit of a hearing aid. The invention also relates to a corresponding hearing aid.

A hearing aid is used to assist a hearing-impaired user and thereby to compensate for an associated hearing loss of such a user. For this purpose, the hearing aid usually has a microphone, a signal processing unit and a receiver. The microphone produces an input signal, which is fed to the signal processing unit. The signal processing unit modifies the input signal, thereby producing an output signal. In order to compensate for hearing loss, the input signal is amplified by a frequency-dependent gain, for example according to an audiogram of the user. Finally, the output signal is output by the receiver to the user. Sound signals from the environment are thereby output to the user in a modified form. The input signal and the output signal are both electrical signals. In contrast, the sound signals from the environment and the sound signals output by the receiver are acoustic signals.

If the user himself or herself is speaking, his or her own voice is picked up in the input signal, and is accordingly also output again to the user by the output signal. This reproduction of the user's own voice by the hearing aid is of particular importance, and often determines the acceptance of the hearing aid by the user. It has been found that many users are particularly sensitive to noticing their own voice. It is hence desirable for the hearing aid to output the user's own voice in the closest possible agreement with the conceptions and preferences of the user.

SUMMARY OF THE INVENTION

It is accordingly an object of the invention to provide a method for operating a hearing aid, and a hearing aid, which overcome the hereinafore-mentioned disadvantages of the heretofore-known methods and devices of this general type and which improve the operation of a hearing aid, especially with regard to the reproduction of the hearing aid user's own voice.

With the foregoing and other objects in view there is provided, in accordance with the invention, a method for operating a hearing aid of a user, wherein the hearing aid has an input transducer, which produces an input signal, the hearing aid has an analysis unit, the analysis unit identifies a current scene from the input signal, the hearing aid has a signal processing unit having an OV processing unit, the signal processing unit is used to process the input signal into an output signal, and in this process, the OV processing unit processes the user's own voice in accordance with a number of OV parameters, the OV parameters are configured depending on the current scene, with the result that the processing of the own voice is scene-dependent, and the hearing aid has an output transducer, which is used to output the output signal to the user.

With the objects of the invention in view, there is concomitantly provided a hearing aid having a control unit configured to carry out the method according to the invention.

The subject matter of the dependent claims contains advantageous embodiments, developments and variants. The statements relating to the method also apply mutatis mutandis to the hearing aid. Where steps of the method are described below explicitly or implicitly, preferred embodiments of the hearing aid result from it having a control unit that is configured to carry out one or more of these steps.

The method is used to operate a hearing aid of a user. The user has his or her own voice. The operation takes place in particular during the intended use of the hearing aid by the user in daily life and while the user is wearing the hearing aid in, or on, his or her ear.

The hearing aid has an input transducer, which produces an input signal. The input transducer is preferably a microphone.

In addition, the hearing aid has an analysis unit, which identifies from the input signal a current scene, in particular an own-voice scene. A scene is in general the acoustic environment of the user (more precisely of the hearing aid) at a given time and at a given location and is mainly characterized by one or more noise sources (e.g. people speaking, machines, environmental, etc.) and associated noise (e.g. wanted noise such as speech or music, unwanted noise, environmental noise, etc.) in the environment, and by the acoustic properties of the environment (e.g. with/without background noise, inside/outside, with reverberation/without reverberation, etc.). As a result, i.e. as a result of identifying the current scene, the analysis unit outputs a scene signal indicating the current scene. In a suitable embodiment, the analysis unit contains a classifier, to which the input signal is fed, and which then analyzes the input signal, for example spectrally, and outputs as the result, i.e. as the scene signal, a scene class, for instance speech in a quiet environment, speech with unwanted noise, multiple people speaking, 1-to-1 conversation, music, quiet environment without speech, unwanted noise without speech, etc.

The hearing aid also has a signal processing unit having an OV processing unit. The abbreviation OV means generally "own voice," and refers to the hearing aid user's own voice. The OV processing unit is hence an own-voice processing unit. The signal processing unit is used to process the input signal into an output signal. In this process, the OV processing unit processes the user's own voice in accordance with a number of OV parameters. "A number of" is understood to mean in general "one or more" or "at least one." For example, to do this, the own voice is first isolated or even filtered from the input signal, then processed and finally recombined with the input signal in order to form the output signal. It is also possible that the input signal is processed as a whole in such a way that precisely those components that belong to the own voice are processed. The OV parameters are now configured depending on the current scene (i.e. depending on the scene signal from the analysis unit), with the result that the processing of the own voice is scene-dependent. The OV parameters influence how the own voice is affected, in particular in terms of loudness, time dynamics and/or frequency spectrum, and accordingly define, for example, an attenuation/amplification, frequency shift, compression, delay, etc., which the OV processing unit then implements in a targeted manner for the own voice (e.g. confined to the associated frequency range).

Finally, the hearing aid has an output transducer, which is used to output the output signal to the user and hence also to reproduce the processed own voice. The output transducer is preferably a receiver. The input signal and the output signal are in particular both electrical signals.

A central concept of the present invention is scene-dependent processing (also modification) of the user's own voice. Accordingly for this purpose, in a first step, the current scene is firstly identified, and then, in a second step, an associated configuration for the OV parameters is selected and set, with the result that the OV processing unit processes the own voice differently in different scenes, namely depending on the OV parameters, which are indeed configured depending on the scene. For each of a plurality of scenes is stored a corresponding configuration, which is then activated when the current scene matches that particular scene. As a result, the user's own voice is also output to the user differently in different scenes, namely in particular always adapted as optimally as possible to the scene at that time.

The invention is based in particular on the observation that the requirements for the reproduction of the own voice, for example with regard to intensity, frequency spectrum, and/or time dynamics, are different for different scenes, i.e. in different environments and different communication situations. Many users react particularly sensitively to the reproduction of their own voice, and non-optimum reproduction often results in the hearing aid being rejected. It is fundamentally advantageous to specify a configuration for the reproduction of the own voice at least for a single designated scene, and to set this whenever the own voice is identified irrespective of the overall scene. This single designated scene is normally "own voice in a quiet environment," i.e. the user is speaking while the entire environment is quiet overall (i.e. "in silence," e.g. insulated in a room without further noise sources, or all noises apart from the own voice have a maximum level of 40 dB) and also while no other person is speaking. In this situation, the own voice stands out most to the user, and therefore it is particularly expedient to specify the OV parameters for this scene. The loudness, frequency spectrum and/or time dynamics of a user vary, however, both physically and psychologically (depending on the personality of the user, the form of communication, one's own perception of one's own voice, etc.) according to whether the user is speaking in a quiet environment or as one person amongst a group of people. There are various reasons for this. From the evolutionary viewpoint, humans often want to avoid their own voice obscuring another, potentially interesting and dangerous noise, in general a relevant noise. In addition, people are especially sensitive to how their own voice is perceived by other people, and a person changes his or her voice (loudness, frequency spectrum, time dynamics, etc.) depending on the speaking situation, in general depending on the current scene. For example, the own voice is different (e.g. louder) in a scene in which several people are communicating at once, compared with a scene in which communication is with just one person. An individual configuration that has been determined in a scene having a quiet environment as described above is accordingly not optimum for other, sometimes widely different, scenes, especially in those containing a communication situation in which other, external voices are present. This problem is solved in this case by the scene-dependent configuration of the OV processing unit, because dedicated, optimum configurations for each of a plurality of different scenes are thereby provided, which configurations are then activated, i.e. used, when the particular scene exists.

The hearing aid suitably has a memory, in which are stored a plurality of configurations for the OV parameters, namely one configuration for each scene that the analysis unit is able to identify. The configurations are determined in particular in advance and stored in the memory, expediently during a fitting session, for example with a hearing-aid audiologist or other professional. In principle, however, it is also possible for configurations to be determined and stored when the hearing aid is in operation or even for the configurations to be stored subsequently, for instance during an update of the hearing aid.

The analysis unit preferably distinguishes between at least two scenes in which the own voice is present, and hence at least two different configurations are available, in particular stored, and can be set for the OV parameters. Thus this does not involve merely enabling and disabling according to whether the own voice is present, but instead involves distinguishing between scenes that each have an own voice, but apart from that, have different properties, i.e. involves processing the own voice differently in different own-voice scenes (or own-voice situations). The configurations are generally only relevant to those scenes in which the user himself or herself is speaking and thus the own voice is present, i.e. in what are called OV scenes. For other scenes, i.e. scenes without an own voice, i.e. non-OV scenes, no configurations for the OV parameters are needed, because in such scenes the OV processing unit is suitably inactive and at least processing of the own voice does not take place. Accordingly, each of the configurations, a plurality of which are fundamentally available and can be set, is associated with a scene in which the own voice is present.

Preferably, a first of the scenes is a base scene, for which a base configuration for the OV parameters is available and can be set, and a second of the scenes is a derived scene, for which a derived configuration for the OV parameters is available and can be set. The derived configuration is derived from the base configuration. Thus the base configuration forms a prototype and starting point for creating or defining further configurations, which are accordingly then derived from the base configuration. For the derivation, a transformation function is derived from the differences between the derived scene and the base scene, and is used to modify the base configuration in order to obtain a derived configuration.

In a suitable embodiment, the derived configuration is derived from the base configuration by using an interaction model, which models an interaction between a hearing-impaired user and his or her environment (hearing impaired speaker-environment interaction). The hearing-impaired user is not necessarily specifically the precise hearing-aid user otherwise described herein, but in particular is generally a prototype for a hearing-impaired user. The interaction model models in particular the change in the own voice when there is a switchover between two different scenes, and is based on relevant findings, which have been obtained in pilot tests or studies, for example. For example, the study by Toyomura et al., "Speech levels: Do we talk at the same level as we wish others to and assume they do?," Acoust. Sci. & Tech. 41, 6 (2020), shows that people adjust the loudness of their own voice depending on the conversational situation. By virtue of the interaction model, it is not necessary to determine the different configurations by actually recreating the different scenes, but instead it is sufficient to determine the configuration for a single scene (the base configuration for the base scene) and then, on the basis thereof, use the interaction model to calculate one or more further configurations. This is done either outside the method described herein or as part of this method.

The further details of the interaction model are of secondary importance in the first instance. In a particularly simple and suitable embodiment, the derived configuration is obtained from the base configuration by adjusting this base configuration by a variable strength of effect. For example, the strength of effect is a factor between 0 and 1, by which the base configuration is multiplied. The value of the strength of effect is determined by the interaction model, which then outputs a value for the strength of effect depending on the scene, for instance by using the volume level of the scene as an input parameter for the interaction model. For example, the interaction model produces for speech with unwanted noise a strength of effect of 0, and for a quiet environment without speech a strength of effect of 1. The transition is either discrete or continuous. A multidimensional interaction model is also advantageous. In a suitable embodiment, the strength of effect is dependent both on the unwanted-noise level of the scene and on the number of people speaking in the scene. A quiet environment without people speaking is adopted as the base scene, which is associated with the base configuration. The strength of effect increases as the number of people speaking increases, while it decreases as the unwanted-noise level rises. Using the strength of effect to modify the base configuration then produces configurations derived for correspondingly divergent scenes.

The base scene is expediently characterized in that only the own voice is present in a quiet environment (as already described above). In other words, the user himself or herself is speaking, but otherwise there are no other noises present, specifically also no other voices. Thus the base scene is basically a scene in which as far as possible solely the own voice is present.

In a suitable embodiment, the base configuration has been determined in advance in a fitting session (also see earlier) in a personalized manner for the user, i.e. according to personal attributes of the user such as age, gender, personality, etc. The fitting session is carried out, for example, by a hearing-aid audiologist or other professional, or at least under their guidance. A fitting session by the user himself or herself is also possible, for instance with instruction by a professional by telephone or guided by software by using a smartphone or the like. What is important is that the base configuration is determined in a personalized manner for the user, so that also all the derived configurations are personalized at least to some extent.

In an expedient embodiment, the OV parameters are configured by an automatic configuration unit, which receives from the analysis unit a scene signal indicating the current scene, and outputs the OV parameters. The configuration unit is accordingly connected both to the analysis unit and to the signal processing unit. In particular, the configuration unit is part of the hearing aid. The configuration unit in particular also accesses the memory, and automatically retrieves therefrom, depending on the scene signal, the associated configuration, and then controls, likewise automatically, the OV processing unit in the manner that the OV parameters are set according to this configuration.

As already intimated above, the method described herein is initially relevant only to OV scenes, i.e. for those scenes in which the own voice is present because the user himself or herself is speaking. In all other scenes, the OV processing unit is typically not needed and is therefore expediently deactivated. The analysis unit accordingly suitably identifies whether the own voice is present, and the OV processing unit is activated only when the analysis unit has identified that the own voice is present. In this case, the OV processing unit is then configured, i.e. the processing of the own voice is controlled, depending on the scene. Hence the operation of the hearing aid has basically two levels: at a first level is identified whether or not the own voice is present in the current scene. If the own voice is present in the current scene, the OV processing unit is activated and the own voice processed; otherwise it is deactivated. At a second level is then configured the precise manner in which the own voice is processed. This is then done depending on the scene, so that the own voice is processed optimally depending on the current scene and hence ultimately is also reproduced, i.e. output to the user, with an optimum and in particular personalized adjustment.

How the current scene is actually identified is of secondary importance in the first instance. In particular, it is more important that different OV scenes are distinguished. In a suitable embodiment, the analysis unit identifies the current scene by ascertaining from the input signal one or more of the following parameters of the current scene: environment class, number of people speaking, position of one or more people speaking, type of background noise, unwanted-noise level, movement (of the user). In particular, the current scene is thereby classified, i.e. allocated to one of a plurality of classes. Suitable classes for scenes containing own voice are in particular: own voice in a quiet environment, conversation with more than two (external) people speaking, 1-to-1 conversation (user and one external person speaking), etc.

The signal processing unit preferably has a scene processing unit, which is used to process the input signal, besides the own voice, into the output signal depending on the current scene. In the scene processing unit, the input signal is thus also processed directly depending on the scene signal, and not just indirectly by the OV processing unit, which first derives the OV parameters from the scene signal. Thus in addition to processing the own voice, the other noises in the environment are also processed. In particular, this implements the original function of a hearing aid, namely assisting the in particular hearing-impaired user and thereby compensating for a corresponding hearing loss of the user. In order to compensate for hearing loss, the input signal is amplified by using the scene processing unit by a frequency-dependent gain, for example according to an audiogram of the user. Sound signals from the environment are thereby output to the user in a modified form taking into account the audiogram. The statements in the introductory part above also apply in particular to the hearing aid according to the invention described herein. The hearing aid is in particular either a monaural or a binaural hearing aid.

The hearing aid according to the invention has a control unit that is configured to carry out the method as described above. One or more of the aforementioned units (analysis unit, signal processing unit, OV processing unit, scene processing unit, configuration unit) or the memory or a combination thereof are preferably part of the control unit of the hearing aid.

Other features which are considered as characteristic for the invention are set forth in the appended claims.

Although the invention is illustrated and described herein as embodied in a method for operating a hearing aid, and a hearing aid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
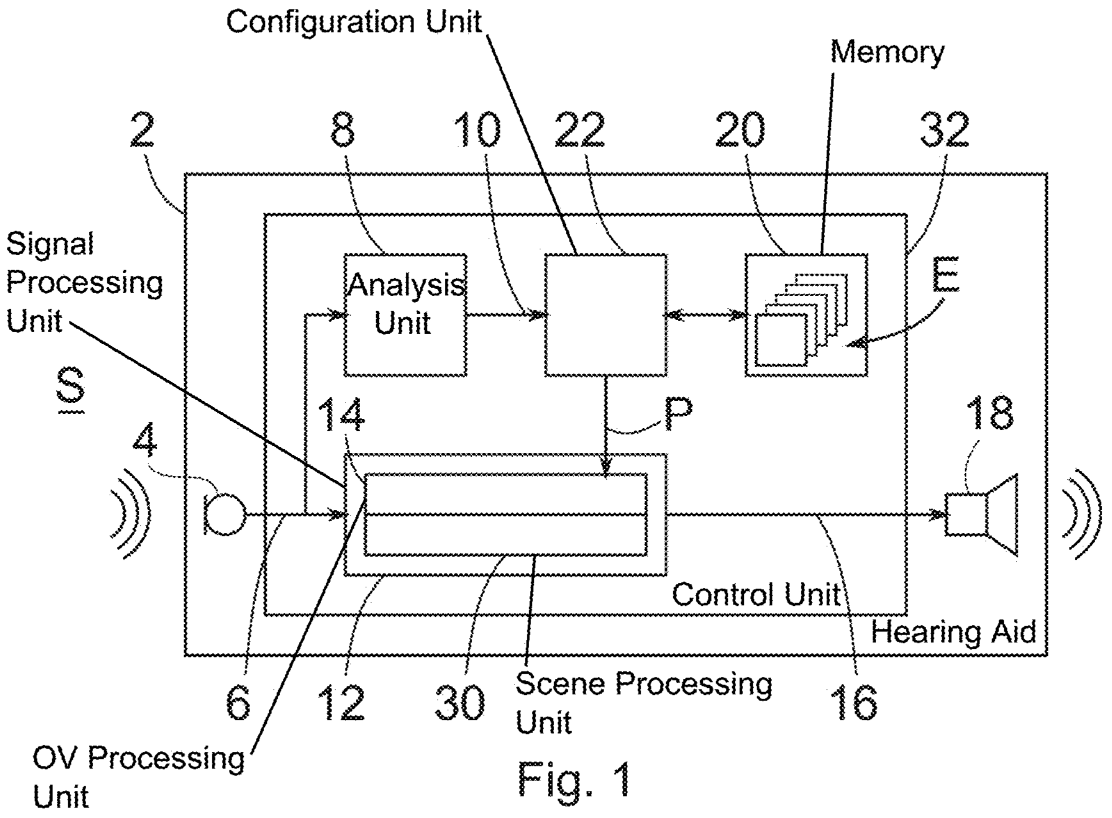
FIG. 1 is a block circuit diagram of a hearing aid.

Referring now to the figures of the drawings in detail and first, particularly, to FIG. 1 thereof, there is seen an exemplary embodiment of a hearing aid 2 according to the invention for a user N (not shown explicitly in FIG. 1). The hearing aid 2 has an input transducer 4, which in this case is a microphone and produces an input signal 6 from noises in the environment of the user N. The hearing aid 2 has an analysis unit 8, which identifies a current scene S from the input signal 6. A scene S is in general the acoustic environment of the user N at a given time and at a given location and is mainly characterized by one or more noise sources and associated noise in the environment, and by the acoustic properties of the environment. As a result, the analysis unit 8 outputs a scene signal 10 indicating the current scene S.

The hearing aid 2 also has a signal processing unit 12 having an OV processing unit 14. The abbreviation OV means generally "own voice," and refers to the own voice of the user N of the hearing aid 2. The signal processing unit 12 is used to process the input signal 6 into an output signal 16. In this process, the OV processing unit 14 processes the own voice of the user in accordance with a number or plurality of OV parameters P. "A number or plurality of" is understood to mean in general "one or more" or "at least one." For example, to do this, the own voice is first isolated or even filtered from the input signal 6, then processed and finally recombined with the input signal 6 in order to form the output signal 16. In the exemplary embodiment of FIG. 1, the input signal 6 is processed as a whole in such a way that precisely those components that belong to the own voice are processed. The OV parameters P are now configured depending on the current scene S, with the result that the processing of the own voice is scene-dependent. The OV parameters P influence how the own voice is affected, in particular in terms of loudness, time dynamics and/or frequency spectrum, and accordingly define, for example, an attenuation/amplification, frequency shift, compression, delay, etc.

Finally, the hearing aid 2 has an output transducer 18, which in this case is a receiver, and is used to output the output signal 16 to the user N and hence also to reproduce the processed own voice.

Figure 2:
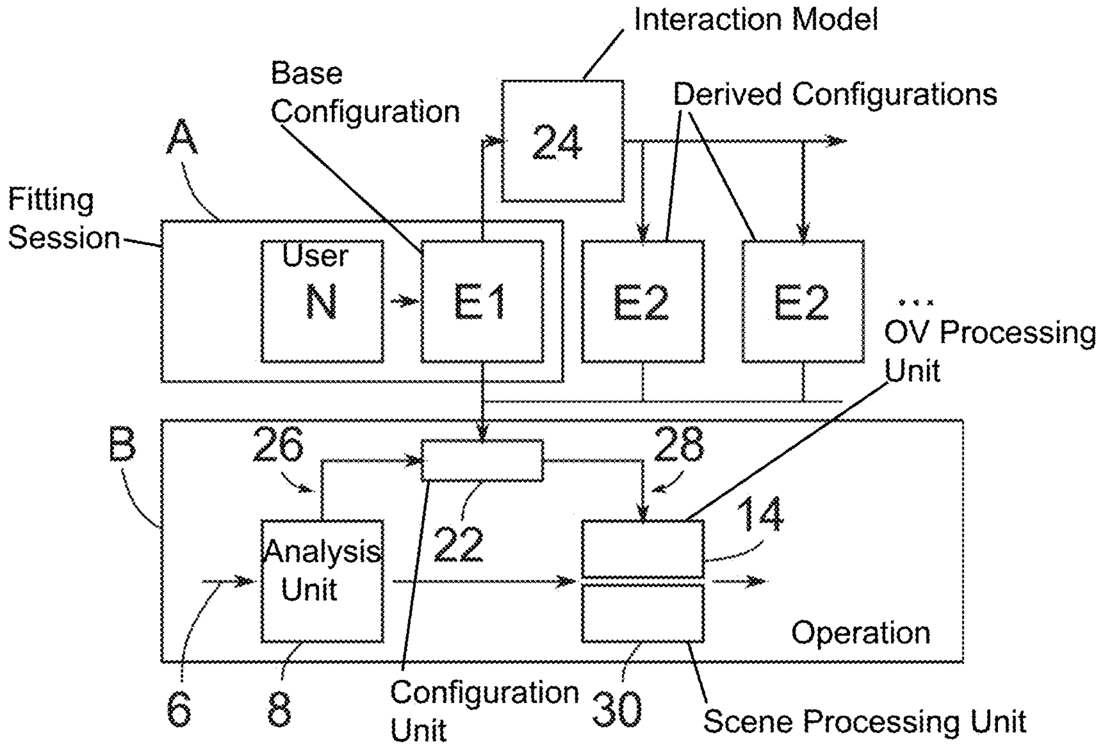
FIG. 2 is a block circuit diagram of a functional view of the hearing aid.
Figure 3:
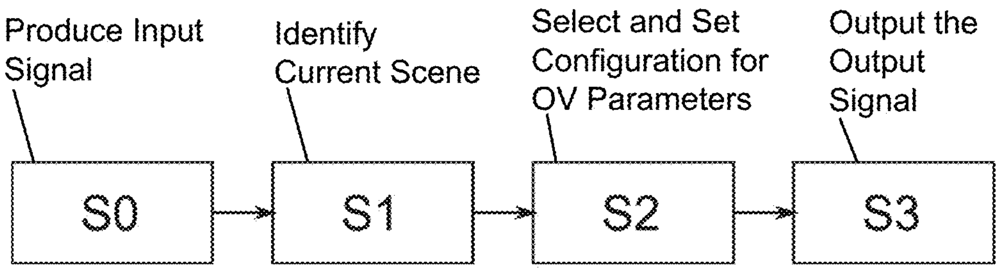
FIG. 3 is a flowchart of a method for operating the hearing aid.

FIG. 2 shows a functional view of the hearing aid 2, in which different components of the hearing aid 2 are shown and the functional relationships between these components are indicated by arrows. FIG. 3 shows an example of a method B for operating the hearing aid 2. The operation B takes place during the intended use of the hearing aid by the user N in daily life and while the user N is wearing the hearing aid 2 in, or on, his or her ear.

Scene-dependent processing of the user N's own voice takes place in this case. For this purpose, after the input signal 6 is produced S0, the current scene S is accordingly firstly identified in a first step S1, and then, in a second step S2, an associated configuration E for the OV parameters P is selected and set, with the result that the OV processing unit 14 processes the own voice differently in different scenes S, namely depending on the OV parameters P, which are indeed configured depending on the scene. For each of a plurality of scenes S a corresponding configuration E is stored, which is then activated when the current scene S matches that particular scene S. Finally, the output signal 16 containing the modified own voice is output S3. As a result, the user N's own voice is also output to the user N differently in different scenes S, namely in particular it is always adapted as optimally as possible to the scene S at that time.

The hearing aid 2 shown herein has a memory 20, in which a plurality of configurations E for the OV parameters P are stored, namely one configuration E for each scene S that the analysis unit 8 is able to identify. The configurations E are determined in this case in advance and stored in the memory 20, for example during a fitting session, for example with a hearing-aid audiologist or other professional.

In FIG. 1, the OV parameters P are configured by an automatic configuration unit 22, which receives from the analysis unit 8 the scene signal 10, and outputs the corresponding OV parameters. The configuration unit 22 is accordingly connected both to the analysis unit 8 and to the signal processing unit 12. The configuration unit 22 also accesses the memory 20, and automatically retrieves therefrom, depending on the scene signal 10, the associated configuration E, and then controls, likewise automatically, the OV processing unit 14 in such a manner that the OV parameters P are configured according to this configuration E.

The analysis unit 8 distinguishes between at least two scenes S in which the own voice is present, and hence at least two different configurations E are available and can be set for the OV parameters P. Thus, this does not involve merely enabling and disabling according to whether the own voice is present, but instead involves distinguishing between scenes S that each have an own voice, but apart from that, have different properties, i.e. involves processing the own voice differently in different own-voice scenes. The configurations E are generally only relevant to those scenes S in which the user N himself or herself is speaking and thus the own voice is present, i.e. in what are called OV scenes. For other scenes S without an own voice, i.e. non-OV scenes, no configurations E for the OV parameters P are needed, because in such scenes S the OV processing unit 14 is inactive and processing of the own voice does not take place. Accordingly, each of the configurations E, a plurality of which are fundamentally available and can be set, is associated with a scene S in which the own voice is present.

A first of the scenes S is a base scene, for which a base configuration E1 for the OV parameters P is available and can be set, and a second of the scenes S is a derived scene, for which a derived configuration E2 for the OV parameters P is available and can be set. The derived configuration E2 is derived from the base configuration E1. Thus, the base configuration E1 forms a prototype and starting point for creating or defining further configurations E2, which are accordingly then derived from the base configuration E1.

For the derivation, a transformation function is derived from the differences between the derived scene and the base scene, and is used to modify the base configuration E1 in order to obtain a derived configuration E2. The base configuration E1 and the configurations E2 derived therefrom together form the configurations E. FIG. 2 illustrates an example of this. The derived configuration E2 is derived from the base configuration E1 by using an interaction model 24, which models an interaction between a hearing-impaired user N and his or her environment (hearing impaired speaker-environment interaction). The interaction model 24 models the change in the own voice when there is a changeover between two different scenes, and is based on relevant findings, which have been obtained in pilot tests or studies, for example. By virtue of the interaction model 24, it is not necessary to determine the different configurations E by actually recreating the different scenes S, but instead it is sufficient to determine the configuration E for a single scene S (the base configuration E1 for the base scene) and then, on the basis thereof, use the interaction model 24 to calculate one or more further configurations E2.

Figure 4:
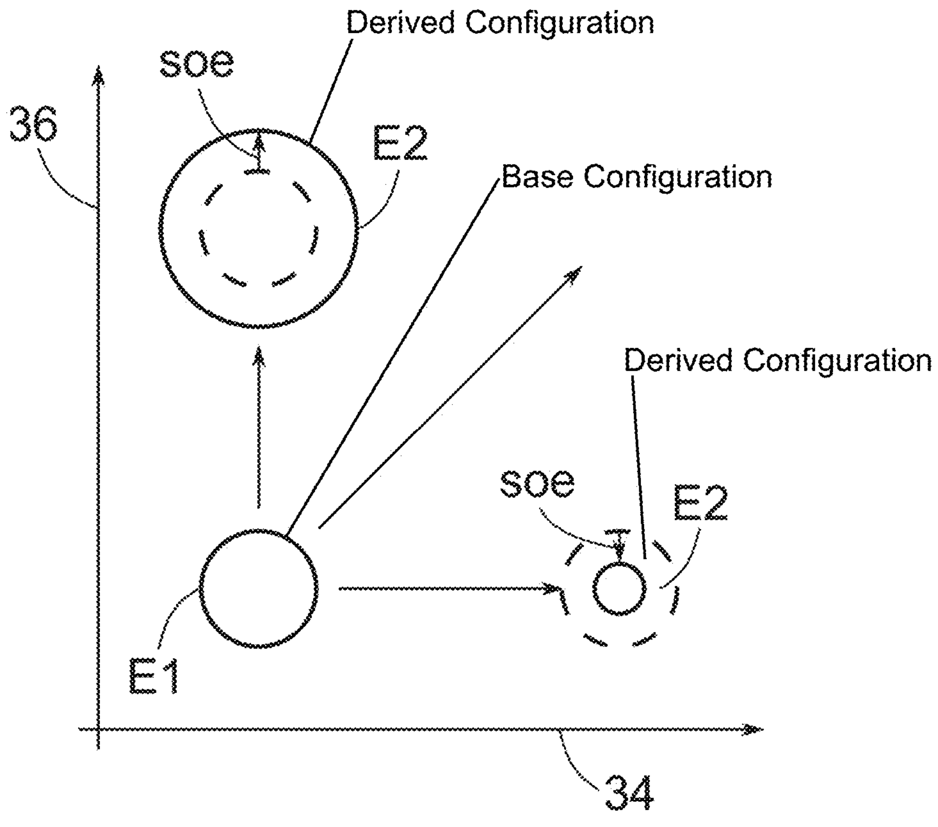
FIG. 4 is an interaction model.

FIG. 4 shows an example of an interaction model 24. According to this example, the derived configuration E2 is obtained from the base configuration E1 by adjusting this base configuration by a variable strength of effect soe. For example, the strength of effect soe is a factor between 0 and 1, by which the base configuration E1 is multiplied. The value of the strength of effect soe is determined by the interaction model 24, which then outputs a value for the strength of effect soe depending on the scene S, for instance by using the volume level of the scene as an input parameter for the interaction model 24. For example, the interaction model 24 outputs a strength of effect of 0 for speech with unwanted noise, and a strength of effect of 1 for a quiet environment without speech. The transition is either discrete or continuous. FIG. 4 shows by way of example a multidimensional interaction model 24, in which the strength of effect soe is dependent both on the unwanted-noise level 34 of the scene S and on the number of people speaking 36 in the scene S. A quiet environment without people speaking is adopted as the base scene, which is associated with the base configuration E1. The strength of effect soe increases as the number of people 36 speaking increases, while it decreases as the unwanted-noise level 34 rises. Using the strength of effect soe to modify the base configuration E1 then produces configurations E2 derived for correspondingly divergent scenes S.

The base scene E1 in this case is characterized in that only the own voice is present in a quiet environment. In other words, the user N himself or herself is speaking, but otherwise there are no other noises present, specifically also no other voices. Thus, the base scene E1 is basically a scene S in which as far as possible solely the own voice is present. In the exemplary embodiment of FIG. 2, the base configuration E1 has been determined in advance in a fitting session A (see also above) in a personalized manner for the user N. The fitting session A is carried out, for example, by a hearing-aid audiologist or other professional, or at least under their guidance. A fitting session A by the user N himself or herself is also possible, for instance with instruction by a professional by telephone or guided by software by using a smartphone or the like. What is important is that the base configuration E1 is determined in a personalized manner for the user N, so that also all the derived configurations E2 are personalized at least to some extent, even though the interaction model 24 is not personalized.

As already intimated, the method described herein is initially relevant only to OV scenes, i.e. for those scenes S in which the own voice is present because the user N himself or herself is speaking. In all other scenes S, the OV processing unit 14 is typically not needed and is therefore deactivated. The analysis unit 8 accordingly identifies in this case whether the own voice is present, and the OV processing unit 14 is activated only when the analysis unit 8 has identified that the own voice is present. In this case, the OV processing unit 14 is then configured, i.e. the processing of the own voice is controlled, depending on the scene. Hence, the operation B of the hearing aid 2 has basically two levels: at a first level 26, it is identified whether or not the own voice is present in the current scene S. If the own voice is present in the current scene S, the OV processing unit 14 is activated and the own voice is processed; otherwise it is deactivated. At a second level 28, the precise manner in which the own voice is processed is then configured. This is then done depending on the scene, so that the own voice is processed optimally depending on the current scene S and hence ultimately is also reproduced, i.e. output to the user N, with an optimum and in particular personalized adjustment.

How the current scene S is actually identified is of secondary importance in the first instance. In particular, it is more important that different OV scenes are distinguished. For example, the analysis unit 8 identifies the current scene S by the analysis unit 8 ascertaining from the input signal 6 one or more of the following parameters of the current scene S: environment class, number of people speaking, position of one or more people speaking, type of background noise, unwanted-noise level, movement (of the user N). The current scene S is hence in particular classified, i.e. allocated to one of a plurality of classes, for instance own voice in a quiet environment, conversation with more than two (external) people speaking, 1-to-1 conversation (user N and one external person speaking), etc.

In the exemplary embodiment shown herein, the signal processing unit 12 also has a scene processing unit 30, which is used to process the input signal 6 into the output signal 18 depending on the current scene S. Thus, in addition to processing the own voice, the other noises in the environment are also processed. This implements the original function of a hearing aid 2, namely assisting the hearing-impaired user N and thereby compensating for a corresponding hearing loss of the user N. In order to compensate for the hearing loss, the input signal 6 is amplified by using the scene processing unit 30 by a frequency-dependent gain, for example according to an audiogram of the user N. Sound signals from the environment are thereby output to the user N in a modified form taking into account the audiogram.

The hearing aid 2 shown herein also has a control unit 32 that is configured to carry out the method as described above. The above-mentioned units (analysis unit 8, signal processing unit 12, OV processing unit 14, scene processing unit 30, configuration unit 22) and the memory 20 are part of this control unit 32.

The following is a summary list of reference numerals and the corresponding structure used in the above description of the invention:

2 hearing aid
4 input transducer
6 input signal
8 analysis unit
10 scene signal
12 signal processing unit
14 OV processing unit

16 output signal
18 output transducer
20 memory
22 configuration unit
24 interaction model
26 first level
28 second level
30 scene processing unit
32 control unit
34 unwanted-noise level
36 number of people speaking
A fitting session
B operation
E configuration
E1 configuration, base configuration
E2 configuration, derived configuration
N user
P OV parameters
S scene
soe strength of effect
S0 acquisition of an input signal
S1 first step
S2 second step
S3 output of an output signal

The invention claimed is:

1. A method for operating a hearing aid of a user, the method comprising:

providing the hearing aid with an input transducer and using the input transducer to produce an input signal;

providing the hearing aid with an analysis unit and using the analysis unit to identify a current scene from the input signal;

providing the hearing aid with a signal processing unit having an own voice (OV) processing unit;

using the signal processing unit to process the input signal into an output signal, while using the OV processing unit to process the user's own voice in accordance with a plurality of own voice (OV) parameters;

configuring the OV parameters in dependence on the current scene, resulting in the processing of the own voice being scene-dependent;

providing a first scene of a plurality of scenes as a base scene, for which a base configuration is available and can be set for the OV parameters;

providing a second scene of the plurality of scenes as a derived scene, for which a derived configuration is available and can be set for the OV parameters, the derived configuration being derived from the base configuration; and providing the hearing aid with an output transducer and using the output transducer to output the output signal to the user.

2. The method according to claim 1, which further comprises providing the hearing aid with a memory storing a plurality of configurations.

3. The method according to claim 2, which further comprises using the memory to store one configuration for each scene able to be identified by the analysis unit.

4. The method according to claim 1, which further comprises using the analysis unit to distinguish between at least two scenes in which the own voice is present, and making at least two different configurations available and able to be set for the OV parameters.

5. The method according to claim 1, which further comprises deriving the derived configuration from the base configuration by using an interaction model modeling an interaction between a hearing-impaired user and an environment of the hearing-impaired user.

6. The method according to claim 1, which further comprises providing the base scene as a scene in which only the own voice is present in a quiet environment.

7. The method according to claim 1, which further comprises determining the base configuration for the user in a fitting session in a personalized manner.

8. The method according to claim 1, which further comprises configuring the OV parameters by using an automatic configuration unit receiving from the analysis unit a scene signal indicating the current scene and outputting the OV parameters.

9. The method according to claim 1, which further comprises:

using the analysis unit to identify whether the own voice is present; and activating the OV processing unit only when the analysis unit has identified that the own voice is present.

10. The method according to claim 1, which further comprises using the analysis unit to identify the current scene by having the analysis unit ascertain from the input signal one or more following parameters:

environment class, number of people speaking, position of one or more people speaking, type of background noise, unwanted-noise level, movement.

11. The method according to claim 1, which further comprises providing the signal processing unit with a scene processing unit used to process the input signal, besides the own voice, into the output signal depending on the current scene.

12. A hearing aid, comprising a control unit configured to carry out the method according to claim 1.

* * * * *